United States Patent [19]

Phlipot et al.

[11] Patent Number: 4,613,112
[45] Date of Patent: Sep. 23, 1986

[54] QUICK-DISCONNECT FITTING FOR GAS LINE CONNECTION

[75] Inventors: James R. Phlipot; Randolph E. Scharfenberg, both of St. Louis, Mo.

[73] Assignee: Essex Industries, Inc., St. Louis, Mo.

[21] Appl. No.: 756,709

[22] Filed: Jul. 19, 1985

[51] Int. Cl.[4] ............................................. F16L 37/08
[52] U.S. Cl. ................................. 251/149.6; 137/71; 285/317
[58] Field of Search ............................ 137/68 R, 71; 251/149.6; 285/317, DIG. 25

[56] References Cited

U.S. PATENT DOCUMENTS 3,592,231 7/1971 Lamb ........................... 251/149.6 X
3,851,666 12/1974 Hammond ..................... 251/149.6 X
4,541,457 9/1985 Blenkush ...................... 285/317 X Primary Examiner—Gerald A. Michalsky
Attorney, Agent, or Firm—Kalish & Gilster

[57] ABSTRACT

A quick-disconnect fitting for quick connection or disconnection of an oxygen line, for receiving a gas line plug of the type having a plug flange to provide gas to an oxygen line terminated by the plug. A metal valve body has a threaded inner end for being threadably received by a source of pressurized oxygen and an outer end carrying a molded plastic cap having a receptacle for receiving the plug. The valve body includes a plunger-type valve axially shiftable therein between open and closed positions, the valve carrying at its upper end a poppet for sealing engagement with a valve seat of the valve body when the valve is closed. A compression spring surrounds the valve for urging it into closed position. A nose of the plug engages and maintains open the valve member when the plug is received within the cap for receiving gas from the source. The cap carries a locking plate for selective locking engagement with the plug flange when the plug is received. The cap receptacle is cross-sectionally configured for unique mutual engagement of the plug for preventing its connection to an improper source.

13 Claims, 5 Drawing Figures

FIG. 1
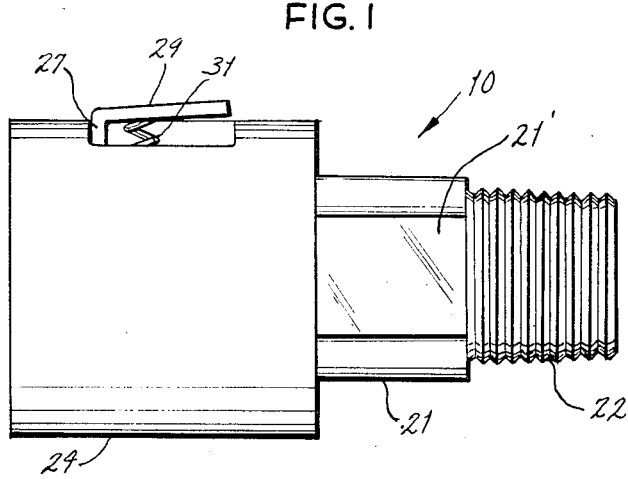
FIG. 2
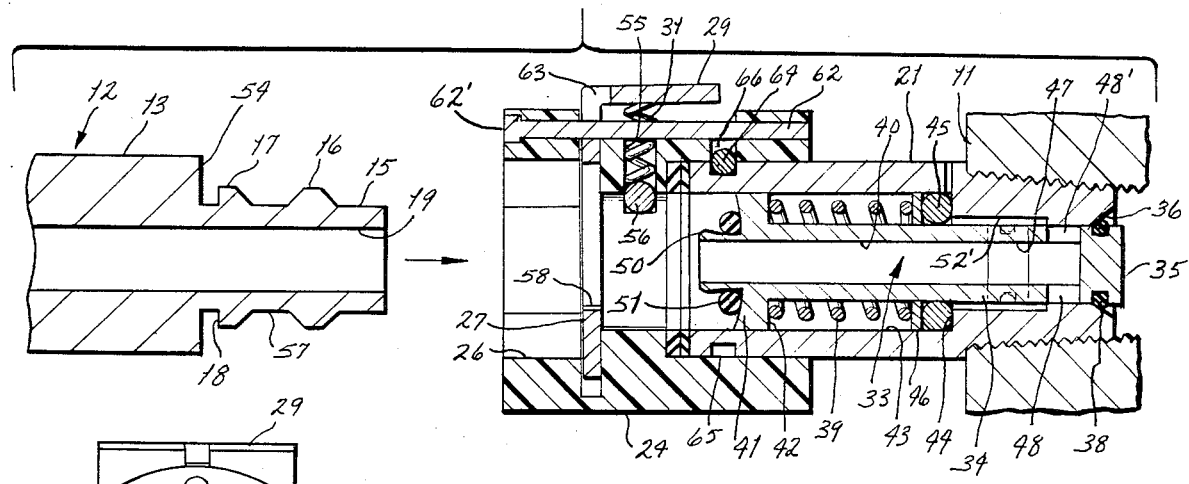
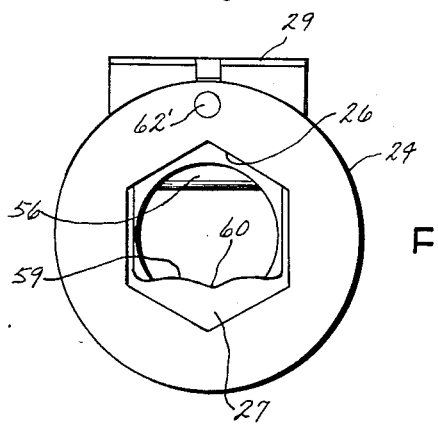
FIG. 3
FIG. 5
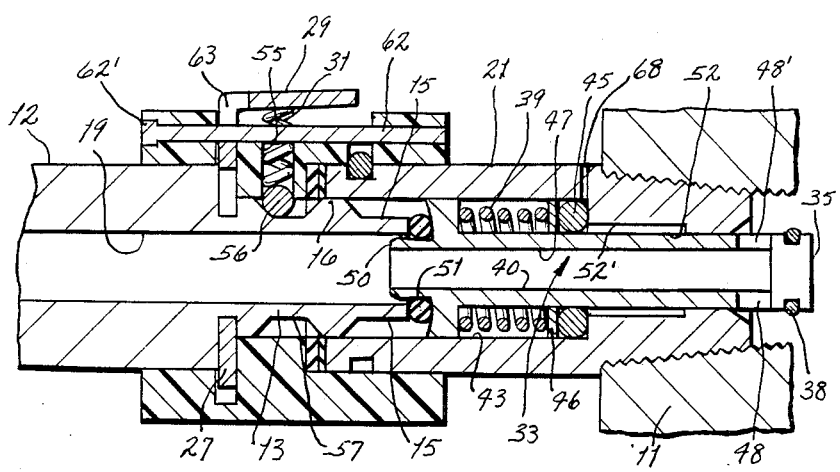
FIG. 4

QUICK-DISCONNECT FITTING FOR GAS LINE CONNECTION

BACKGROUND AND SUMMARY OF THE INVENTION

This invention is concerned with connection of oxygen and other gas lines, and, more particularly, to a quick-disconnect fitting for allowing oxygen lines or other gas lines to be quickly connected or disconnected.

In hospitals and clinics as well as emergency medical vehicles, and also on non-institutional premises, where an oxygen line must be connected to a source of oxygen under pressure for supplying medical oxygen to a patient, whether for emergency usage or routine clinical usage or treatment, it is extremely important to facilitate the quick connection and disconnection of an oxygen line, while ensuring that the oxygen line cannot be plugged into an improper source, such as a compressed air line or another pressurized gas source. A fitting for gas line connection and disconnection should provide for safety of connection, ensuring a positive, leak-free connection which will preclude leakage of oxygen, since pressurized oxygen supports rapid combustion and even conduces to explosive gas accumulation, and thus must not be permitted to be vented into the surrounding atmosphere. Such fitting, however, must ensure that when the oxygen line is disconnected, the pressurized oxygen will not be permitted to leak from the fitting.

Accordingly, among the several objects of the invention may be noted the provision of an improved quick-disconnect fitting for connection and disconnection of a gas line; the provision of such a fitting which is especially useful for connection and disconnection of oxygen lines such as for supplying medical oxygen under pressure for patient usage; the provision of such a fitting which provides a secure seal against leakage of the gas from a source of same when the gas line is disconnected; and which is configured for permitting connection of a gas line only to a pre-determined gas source; the provision of such a fitting which although quite economical to manufacture, is long lasting and reliable in operation, and ensures against leakage even in the event of breakage of the fitting; and the provision of such a fitting which is very compactly configured.

It is also an object of the present invention to provide such an improved quick-disconnect fitting which utilizes a cap defining a receptacle for a gas line plug, wherein the cap is of synthetic resin material and is so attached to a valve body of the fitting as to eliminate or minimize stress within the cap such as has heretofore caused stress failure of synthetic parts in prior art constructions, it being also an object of the invention to provide such a cap which is threadless whereby there are no stresses associated with threads either during their manufacture or use for securement. A further object of the invention is the provision of such a fitting in which the cap provides only mechanical securement of elements for securement and disconnection of the plug, while all gas pressure-receiving elements are contained entirely within the valve body, which is most preferably of metal.

An additional object of the invention is the provision of such a fitting which allows venting of overpressure conditions including pressure relief operation of fail-safe type in the event of extreme pressure buildup in a gas line supplying gas under pressure to the fitting.

Briefly, a quick-disconnect of the invention as useful for connecting an oxygen line, for example, either to a source of oxygen under pressure, as well as for quickly disconnecting the line, includes a valve body which is threaded at its inner end for being threadably received by the oxygen source, such as a gas manifold. The valve body includes a plunger-type valve axially shiftable between open and closed positions, and carrying at its inner end a seal for sealing engagement with the valve body when closed. A compression spring surrounding the valve urges it into closed position. A cap molded of synthetic resin material is carried at the outer end of the valve body, being provided with a receptacle for receiving an oxygen line plug of the type having a plug flange. The cap includes a locking plate which is shiftable transversely to the receptacle and is configured for locking engagement with the plug flange. The plug includes a nose for engaging and maintaining open the valve member so long as the plug is retained by the cap in locked engagement. The cap receptacle is cross-sectionally configured for unique mutual engagement of the plug to prevent improper connection thereof.

DESCRIPTION OF THE DRAWINGS

FIG. 1 is a side elevation view of a quick-disconnect gas fitting, as utilized for permitting quick connection or disconnection of an oxygen line, in accordance with and embodying the present invention.

FIG. 2 is an exploded longitudinal cross-section of the fitting of FIG. 1 and portions of a gas line male-type termination, i.e., a plug for being received by the quick-disconnect fitting.

FIG. 3 is a front end elevation view of the fitting of FIG. 1.

FIG. 4 is a longitudinal vertical cross-section similar to FIG. 2 but illustrating the plug as received within the quick-disconnect fitting of the invention.

FIG. 5 is a plan view of a horseshoe-shaped element utilized in assembling the elements of the fitting of FIG. 1.

DESCRIPTION OF THE PREFERRED EMBODIMENT

Referring now to the drawings, illustrated generally at 10 is a quick-disconnect fitting for facilitating quick connection of an oxygen line of the type utilized in hospitals and clinics as well as in emergency medical usage, and by which medical oxygen as from a manifold 11 is supplied under pressure for emergency or routine clinical usage by a patient. In these types of usage, it is extremely important to facilitate the quick connection or disconnection of an oxygen line one end of which is generally 12, while ensuring that the oxygen line cannot be plugged into an improper source such as a compressed air line or another pressurized gas source, as such would be dangerous or life-threatening to a patient.

Only a plug 13 of gas line 12 is shown, being conventionally of male configuration for being received by the female-type fitting 10. Such plug 13 is of the type having a nose 15 having a central boss 16 and a flange 17 defining a shoulder 18, said nose having a central bore 19.

The fitting 10 comprises a cylindrical metal valve body 21 such as for example brass, which is threaded at its inner end as at 22 for being threadably received by the oxygen source 11. At the other end of the valve body 21 is a cylindrical cap 24 molded of synthetic resin material and including locking means for locking engagement with the plug flange 17 when plug 13 is received by a receptacle 26 of cap 24 for locking plug 13 within cap 24 to provide for delivery of gas from source 11 to gas line 12, and selectively operable for unlocking the plug to permit it to be withdrawn from cap 24. The body has wrench flats 21'.

Said locking means takes the form of a flat plate 27 which is transversely shiftable within cap 24 by manual actuation of an actuating tab 29 bent in substantially right-angle configuration to the plane of flat plate 27 and biased radially outwardly therefrom by a springs 31 whereby to be maintained in a plug-locking position.

The new fitting ensures that even if the cap 24 is broken or separated from valve body 21 or otherwise dislodged, a sealing relationship with respect to the gas source 11 will always be maintained. To this end, there is provided a plunger-type valve generally designated 33 including a stem 34 having a poppet 35 at the inner end thereof, the poppet thereby being actually within the structure of the gas manifold or other source 11. The inner end of the valve body 21 defines a chamfered seat 36 against which an O-ring seal 38 carried by poppet 35 is maintained in sealing relationship by a coiled compression spring 39. Stem 34 is provided with an axial bore 40.

The outer end of stem 34 is provided with a radial flange 41 defining a shoulder 42, and said flange 41 being axially reciprocal within a relatively enlarged axial bore 43 of valve body 21. Bore 43 defines a shoulder or seat 44 against which is seated an O-ring 45 and, in turn, against which is seated a washer 46 against which spring 39 bears to resiliently urge flange 41 outwardly and to thereby maintain O-ring 38 of poppet 35 in sealing relationship against seat 36.

As shown in FIG. 4, nose 15 of the plug 13 may thus engage in maintaining an open position of valve 33.

Valve 33 includes an axial bore 47 which communicates through openings 48, 48' at the inner end of valve member 33 for permitting oxygen to flow under pressure through bore 40 and thereby into bore 19 of the plug 13. At the outer end of stem 34 is a nipple 50 for being received, as shown in FIG. 4, within the bore 19 of the plug. Concentric with nipple 50 is an O-ring 51 of sealing material such as of nitrile rubber for providing a sealing engagement with the nose 15 of the plug. Thus, when the plug is received by aperture 26 in locked engagement, a sealing relationship between the plug and O-ring 51 will ensure gas-tight communication through the valve 33 to deliver oxygen under pressure to oxygen line 12. O-ring 45 ensures that gas will not leak through a bore 52 in which the inner portion of stem 34 extends.

For locking plug 13 into engagement within fitting 10, it will be seen that boss 16 is configured for camming plate 27 for shifting it in a direction for permitting clearance for plug flange 17 and with the plug then fully received until a shoulder 54 of the plug engages said plate 27, whereupon the plate is free to shift under the bias of springs 31 to the locking position shown in FIG. 4. The plug will thus be retained in fitting 10 until selective engagement of tab 29 for shifting the plate against the force exerted by springs 31. Such will permit the plug to be withdrawn, whereupon the valve spring 39 will cause it to be shifted into the closed, sealing position shown in FIG. 2.

There will be observed at the lower end of a radial bore 55 for each spring 31 a rod 56 of circular cross-section. Rod 56 provides a detent function, being received in an appropriately configured groove for permitting it to ride up and down within bore 55 by an extent necessary to permit boss 16 to pass as the plug is inserted. Then, when the plug is fully received, detent rod 56 is seated in a land 57 defined between boss 16 and flange 18.

According to the preferred construction, the opening 58 in plate 27 for receiving plug 13 is configured with a lip 59 including a slight center recess 60 for providing reliable engagement against the shoulder 18 of plug flange 17. Plate 27 is retained within cap 24 by a groove pin 62 including an enlarged head portion 62', which pin is received in a suitable bore extending longitudinally of the cap. A suitably configured opening 63 is provided at the upper end of plate 27 for receipt of said pin and permitting transverse shifting of plate 27 when tab 29 is pressed toward the cap.

Securement of cap 24 to valve body 21 is carried out by a retainer 64 in the shape of a horseshoe or inverted "U" (FIG. 5). Retainer 64 is received by a peripheral groove 65 formed in the cap-adjacent end of valve body 21. The retainer is inserted through a recess 66 of the cap, being then maintained in position by pin 62.

Consequently, the interconnection of the valve body and cap is nearly completely stress-free, obviated threading of the cap. Threading of plastic parts has heretofore been a major cause of stress failure in plastic parts.

Cap 24 is preferably of strong, durable high tensile strength material such as polysulfone, which is relatively easy to mold and form to the tolerances desired. Hence, the cap is all the more unsusceptible to breakage or fracture.

However, the construction is such that even in the remote possibility of the cap being broken or smashed off or otherwise separated from valve body 21, a gastight relationship of the new fitting will be maintained, thereby ensuring against leakage of oxygen into the adjacent atmosphere.

In the event of such a catastrophic separation of cap 24, as by being smashed by a heavy object or otherwise being torn from the valve body, it will be seen that valve 33 is retained securely within valve body 21 in closed relationship. Moreover, if the cap should become torn from the valve body when the oxygen line is connected, the connection of the oxygen line with valve 33 will be terminated, since the locking plate 27 will be carried away with cap 24. Accordingly, the new valve is fail-safe, the integrity of metal body 21 and its internal valve being at all times assured.

Bore 52 includes an enlarged diameter portion 52' to provide a space around stem 34 for gas passage in the event of gas pressure-relief operation provided as follows: O-ring 38 is preselected of durometer hardness sufficient to permit it to shear, if normally closed against seat 36, at a predetermined source pressure, such as 300 psi, at which point the pressure upon valve member 35 will drive inwardly to the position shown in phantom in FIG. 2. Movement of stem 34 is limited in this eventuality by flange 41 striking rod 56, preventing valve member ejection.

Shown at 68 is a radial bore serving as a vent for communication to the interior of the valve body. Such vent 68, which may be one of a plurality of such vents as desired, is positioned relative to O-ring 45 such that the normal pressure exerted by spring 39 upon O-ring 45 will cause it to maintain a sealing relationship against the end of bore 43, so that under normal conditions, there will be no venting through vent 68. In the event of the overpressure condition developing when plug 13 is received by valve 10 as shown in FIG. 4, overpressure venting is provided through vent 68. If there should be abnormal pressure in the gas source, such gas will leak past valve stem 34, urging O-ring 45 away from its seat to permit the pressure to be vented and, as the pressure falls to nearly normal levels, the force of spring 39 again seats O-ring 45 to close off vent 68. Accordingly, O-ring 38 provides overpressure venting, by shearing, when no plug is received by the new valve; and O-ring 45 provides overpressure venting, by shifting, when a plug has been received by the new valve.

In order to ensure against the possibility of the oxygen line 12 being connected to an improper source of gas, such as compressed air, $CO_2$, etc., cap receptacle 26 is cross-sectionally configured for mutual engagement of the plug. Thus, as shown in FIG. 3, the receptacle 26 is, for example, of hexagonal shape which will correspond with a hexagonal shape of the body proper of plug 13. Various other cross-sectional configurations may be utilized as desired for establishing a unique relationship between the plug and receptacle.

In view of the foregoing, it will be seen that the several objects of the invention and other advantages are achieved by the new constructions which have been described.

Although the foregoing includes the description of the best mode of the embodiments contemplated for carrying out the invention, various modifications are contemplated.

As various modifications could be made in the constructions herein described and illustrated without departing from the scope of the invention, it is intended that all matter contained in the foregoing description or shown in the accompanying drawing shall be interpreted as illustrative rather than limiting.

What is claimed is:

1. A quick-disconnect fitting of fail-safe character for quick connection or disconnection of a gas line, such as an oxygen line, and adapted for receiving a gas line plug of the type having a plug flange, thereby to provide gas to a line terminated by the plug, characterized by the fitting comprising a metal valve body having an inner end externally threaded for being threadably received by corresponding structure of a source of gas under pressure and an outer end to which is secured in non-threaded engagement a cap having a receptacle for receiving the gas line plug, the valve body including a plunger-type valve axially contained internally within the valve body in protected relationship, the valve body being shiftable within the valve body between open and closed positions, the valve carrying at its inner end seal means for sealing engagement with the valve body when the valve is closed, a compression spring surrounding the valve for urging it into close position, the plug including a nose for engaging and maintaining open the valve when the plug is received within the cap for receiving gas from the source, the cap carrying locking means for selective locking engagement with the plug flange when the plug is received by the cap, the cap receptacle being laterally cross-sectionally configured for unique mutual engagement of the plug to prevent improper connection thereof, the cap being of molded synthetic resin material, and means for securing the cap about the periphery of only the outer end of the valve body, whereby if the cap is broken away from the valve body, the valve will remain within the valve body in closed, protected condition without permitting escape of gas from the source through the fitting.

2. A quick-disconnect fitting according to claim 1 and further characterized by the valve being of plunger configuration and including a stem and a poppet carried by the stem at the inner end of the valve body, the inner end of the valve body defining a seat for the poppet, the poppet being thereby located within said corresponding structure of the gas source, said seal means being carried by the poppet for sealing engagement with said seat.

3. A quick-disconnect fitting according to claim 2 and further characterized by the stem including an axial passage for providing communication between the gas line plug and the valve seat.

4. A quick-disconnect fitting according to claim 3 and further characterized by the valve stem defining at its outer end a nipple for being received by a central bore of the gas line plug, the valve stem carrying a sealing ring in concentric relationship to the nipple for sealing engagement with the nose of the plug, the valve body having a bore for receiving a portion of the plug nose, and O-ring seal means for sealing the valve within the last-said bore.

5. A quick-disconnect fitting according to claim 4 and further characterized by the valve stem defining at its outer end a flange axially reciprocal within the valve body bore, the bore defining a shoulder, the compression spring being concentric about the valve stem and located between the flange and the seat of the valve body bore for resiliently urging the flange outwardly within such bore.

6. A quick-disconnect fitting according to claim 1 and further characterized by the means for locking engagement comprising a plate selectively transversely shiftable within the cap for engaging the flange of the plug body, the plate being centrally apertured for receiving the nose of the plug body and defining a shoulder for engagement of the plug body flange.

7. A quick-disconnect fitting according to claim 6 and further characterized by the plate being flat, defining an actuating portion bent from the plane of the plate, the cap carrying a spring for biasing the actuating portion radially outwardly from the cap for shifting the plate into locking engagement with the plug flange, the actuating portion being manually engageable for selective shifting of the plate out of locking engagement with the plug flange thereby to permit withdrawal of the plug from the cap receptacle.

8. A quick-disconnect fitting according to claim 7 and further characterized by the cap having a radial bore for receiving the last-said spring, and a detent rod extending transversely of the radial bore and being engaged by the spring in the radial bore for being urged inwardly of cap receptacle and extending into the recess of the cap for being engaged by the nose of the plug, the plug defining bosses for detented engagement with the detent rod when the plug is received by the cap receptacle.

9. A quick-disconnect fitting according to claim 7 and further characterized by the cap receiving a pin for retaining the locking plate.

10. A quick-disconnect fitting according to claim 1, the means for securing the cap comprising a U-shaped retainer, the outer end of the valve body defining a peripheral groove and the cap being internally recessed for receiving the U-shaped retainer to retain the cap upon the outer end of the valve body in stress-free relationship.

11. A quick-disconnect fitting for quick connection or disconnection of a gas line, such as an oxygen line, and adapted for receiving a gas line plug of the type having a plug flange, thereby to provide gas to a line terminated by the plug, characterized by the fitting comprising a valve body having an inner end adapted for being received by a source of gas under pressure and an outer end carrying a cap having a receptacle for receiving the gas line plug, the valve body including a plunger-type valve axially shiftable therein between open and closed positions, the valve carrying at its inner end means for sealing engagement with the valve body when the valve is closed, a compression spring surrounding the valve for urging it into closed position, the plug including a nose for engaging and maintaining open the valve when the plug is received within the cap for receiving gas from said source, the cap carrying locking means for selective locking engagement with the plug flange when the plug is received by the cap, the cap receptacle being cross-sectionally configured for unique mutual engagement of the plug to prevent improper connection thereof, the valve body being of metal, the cap being of molded synthetic resin material and secured about the periphery of the outer end of the valve body, whereby if the cap is broken away from the valve body, the valve will remain within the metal valve body in closed position, the inner end of the valve body being threaded for being threadably received by corresponding structure of the gas source, the valve being of plunger configuration and including a stem and a poppet carried by the stem at the inner end of the valve body, the inner end of the valve body defining a seat for the poppet, the poppet being threreby located within said corresponding structure of the gas source, the stem including an axial passage for providing communication between the gas line plug and the valve seat, the valve stem defining at its outer end a nipple for being received by a central bore of the gas line plug, the valve stem carrying a sealing ring in concentric relationship to the nipple for sealing engagement with the nose of the plug, the valve body having a bore for receiving a portion of the plug nose, and O-ring seal means for sealing the valve within the last-said bore, the valve stem defining at its outer end a flange axially reciprocal within the valve body bore, the bore defining a shoulder, the compression spring being concentric about the valve stem and located between the flange and the seat of the valve body bore for resiliently urging the flange outwardly within such bore, the valve stem carrying another O-ring for providing a gas seal between the valve body and the valve stem, the spring urging such O-ring into sealing relationship against the valve body, the valve body defining a vent proximate such O-ring for providing venting of gas between the stem and the exterior of the valve body, such O-ring normally sealing the vent but permitting venting of gas through the vent in the vent of gas overpressure overcoming the force of the spring.

12. A quick-disconnect fitting for quick connection or disconnection of a gas line, such as an oxygen line, and adapted for receiving a gas line plug of the type having a plug flange, thereby to provide gas to a line terminated by the plug, characterized by the fitting comprising a valve body having an inner end adapted for being received by a source of gas under pressure and an outer end carrying a cap having a receptacle for receiving the gas line plug, the valve body including a plunger-type valve axially shiftable therein between open and closed positions, the valve carrying at its inner end means for sealing engagement with the valve body when the valve is closed, a compression spring surrounding the valve for urging it into closed position, the plug including a nose for engaging and maintaining open the valve when the plug is received within the cap for receiving gas from said source, the cap carrying locking means for selective locking engagement with the plug flange when the plug is received by the cap, the cap receptacle being cross-sectionally configured for unique mutual engagement of the plug to prevent improper connection thereof, the valve body being of metal, the cap being of molded synthetic resin material and secured about the periphery of the outer end of the valve body, whereby if the cap is broken away from the valve body, the valve will remain within the metal valve body in closed position, the inner end of the valve body being threaded for being threadably received by corresponding structure of the gas source, the valve being of plunger configuration and including a stem and a poppet carried by the stem at the inner end of the valve body, the inner end of the valve body defining a seat for the poppet, the poppet being thereby located within said corresponding structure of the gas source, the stem including an axial passage for providing communication between the gas line plug and the valve seat, said seal means comprising a shearable O-ring of durometer hardness for shearing at predetermined gas source pressure for permitting gas pressure-relief operation of the fitting in the event of overpressure.

13. A quick-disconnect fitting according to claim 12 and further characterized by the valve and valve body being mutually configured for gas pressure venting when the valve member is shifted to a gas venting position, the valve being permitted to shift to the gas venting position only upon shearing of the shearable O-ring.

* * * * *